(12) United States Patent
Burke et al.

(10) Patent No.: US 9,786,955 B1
(45) Date of Patent: Oct. 10, 2017

(54) ASSEMBLY METHODS FOR LIQUID METAL BATTERY WITH BIMETALLIC ELECTRODE

(71) Applicant: Massachusetts Institute of Technology, Cambridge, MA (US)

(72) Inventors: Paul J. Burke, Framingham, MA (US); Satyajit Phadke, Arlington, MA (US); Donald R. Sadoway, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 555 days.

(21) Appl. No.: 14/202,396

(22) Filed: Mar. 10, 2014

Related U.S. Application Data

(60) Provisional application No. 61/779,297, filed on Mar. 13, 2013.

(51) Int. Cl.
*H01M 10/39* (2006.01)
*H01M 10/04* (2006.01)
*H01M 4/46* (2006.01)
*H01M 4/38* (2006.01)

(52) U.S. Cl.
CPC ......... *H01M 10/399* (2013.01); *H01M 10/04* (2013.01); *H01M 4/38* (2013.01); *H01M 4/381* (2013.01); *H01M 4/46* (2013.01); *H01M 10/39* (2013.01)

(58) Field of Classification Search
CPC ............. H01M 4/0445; H01M 4/0438; H01M 10/399; H01M 10/04; H01M 4/38; H01M 4/381; H01M 4/46; H01M 10/39
See application file for complete search history.

(56) References Cited

U.S. PATENT DOCUMENTS

| 3,238,437 | A | * | 3/1966 | Foster | H01M 10/399 320/150 |
|---|---|---|---|---|---|
| 3,488,221 | A | * | 1/1970 | Hiroshi | H01M 10/399 429/103 |
| 3,930,888 | A | * | 1/1976 | Bowser | H01M 6/36 136/230 |
| 8,268,471 | B2 | | 9/2012 | Sadoway et al. | |
| 8,323,816 | B2 | | 12/2012 | Bradwell et al. | |
| 9,000,713 | B2 | | 4/2015 | Boysen et al. | |
| 2008/0044725 | A1 | * | 2/2008 | Sadoway | H01M 2/0252 429/149 |
| 2011/0014503 | A1 | * | 1/2011 | Bradwell | H01M 10/39 429/50 |
| 2011/0014505 | A1 | | 1/2011 | Bradwell et al. | |
| 2014/0099522 | A1 | | 4/2014 | Spatocco et al. | |
| 2014/0272481 | A1 | | 9/2014 | Chung et al. | |

\* cited by examiner

*Primary Examiner* — Lisa S Park
(74) *Attorney, Agent, or Firm* — Sunstein Kann Murphy & Timbers LLP (57) ABSTRACT

Electrochemical cells operating with molten electrodes and electrolyte, where the cathode is an alloy of a metal and metalloid, may be assembled in a discharged state by combining first an anodic metal with a cathodic metal to form a binary alloy. This binary alloy is then placed in a cell housing with the metalloid and the electrolyte, all in the solid state. The temperature is raised to, and maintained at, a temperature above the melting point of the highest melting component until components assembled into horizontal layers of electrolyte above a layer of a ternary alloy formed by the combination of the binary alloy and the metalloid. A charge and discharged cycle is then run through the electrochemical cell.

20 Claims, 6 Drawing Sheets

ASSEMBLY METHODS FOR LIQUID METAL BATTERY WITH BIMETALLIC ELECTRODE

CROSS-REFERENCE TO RELATED APPLICATIONS

This patent application claims the benefit of U.S. Provisional Patent Application No. 61/779,297 filed Mar. 13, 2013, the disclosure of which is incorporated by reference herein in its entirety.

STATEMENT REGARDING FEDERALLY SPONSORED RESEARCH OR DEVELOPMENT

This invention was made with government support under DE-AR0000047 awarded by ARPA-E. The U.S. government has certain rights in the invention.

TECHNICAL FIELD

The present invention relates to energy storage devices and, more particularly, the invention relates to electrochemical cells that, during charging and discharging, function with liquid metals and electrolytes.

BACKGROUND

Electrical energy generation relies on a variety of energy sources that are then converted into electricity, such as fossil fuel, nuclear, solar, wind, geothermic and hydroelectric. Apart from the concern of the dwindling supply of fossil fuel, one of the great challenges of energy supply chains is balancing supply with demand. As the supply of electricity turns to renewable energy, the latter concern becomes more acute as highest energy output may not match the highest energy demand. Thus, storing electrical energy in an efficient way becomes crucial to make these renewable energy sources more viable alternatives to fossil fuel.

All-liquid electrochemical cells offer viable solutions for the storage of energy in an uninterruptible power supply environment. These cells provide efficient storage capabilities because of the rapid ionic migration and facile, reversible reaction kinetics at both metallic electrodes. Energy is stored at the anode which is constituted mainly of a metal, referred to herein as the active metal or anodic metal, having a high chemical potential. In a discharged state, the active metal resides in the cathode at a low chemical potential in the form of an alloy. An electrolyte disposed between two molten electronically conductive electrodes and containing a cation of an anodic metal, enables ionic transport of the active metal during charging or discharging. For example, descriptions of such cells may be found in U.S. Pat. No. 8,323,816, US Patent Publication No. US-2011-0014505-A1, and US Patent Publication No. US-2012-0104990-A1, the entire contents of which are incorporated herein by reference.

Certain electrochemical cells which use bimetallic alloy at the cathode provide cells with a bigger thermodynamic differential because of the lowering of the chemical potential in the alloy compared to the individual metals. Alloying the cathode also provides the advantage of lowering the melting point of the cathode. For example, antimony melts at 631° C. and lead melts at 307° C., while the lead-antimony eutectic alloy melts at 253° C. This, in turn, allows the cells to operate at a lower temperature and/or operate more efficiently. Lowering the melting point of the cathode materials can also increase the solubility limit of the active metal in the cathode, which represents an increase in capacity of the cathode and decrease the cost per energy storage capacity of the cells. Furthermore, cells operating at a lower temperature should experience less corrosion and potentially extended operating lifespan of the cell. For example, descriptions of such cells may be found in US Patent Publication No. US-2012-0104990-A1, the entire content of which is incorporated herein by reference.

Typically, these electrochemical cells are assembled starting with solid state materials. Once all the materials are disposed into the housing, a cell is heated until the materials are melted. Because of the disparity in the density of each of the materials, the anodic metal, the electrolyte and the cathodic metals, upon melting, self-assemble into layers. The anodic and cathodic metals react to form an alloy resulting in the assembly of the cell in the discharged state.

Because of the great disparity of the chemical potential energy between the anodic and cathodic metals, the alloying reaction is very exothermic and uncontrollable and often leads to the formation of various intermetallic compounds of high melting points forming a heterogeneous solid phase. The overall morphology of this solid phase is difficult to control and very difficult to predict as it is the result of a violent chemical reaction involving release of large amounts of energy in a short duration of time. Internal shorting of the cell also often occurs, facilitated by the uncontrolled formation of this heterogeneous solid phase if it is able to establish electrical contact between the two current collectors. This often results in cell failure.

SUMMARY OF VARIOUS EMBODIMENTS

Therefore, there is a need to develop methods of assembling liquid metal electrochemical cells in a controlled manner that is safe, effective and reproducible. There are now described such methods for the safe, effective, and reliable assembling of the materials of an electrochemical cell for operating in the liquid state to reversibly store electrical energy.

In an embodiment of the invention, an electrochemical cell having a housing and positive and negative current collectors is assembled by providing a first solid alloy of an anodic metal of group IA and IIA of the periodic table of the elements with a cathodic metal other than the anodic metal, a solid metalloid, and a solid salt of the anodic metal, and heating these electrochemical components. The components assemble to form two liquid layers, with a first layer containing the salt of the cation of the anodic metal and contacting the negative current collector, and a second layer forming a cathode, the cathode containing the anodic metal, the cathodic metal and the metalloid.

Optionally, the cell may be subjected to a charging cycle, to drive the anodic metal to the negative current collector, and discharged cycle, to drive the anodic metal from the negative current collector to the cathode. Once thus cycled, the cell is fully operational and may be kept in the discharged state for storing, shipping and handling.

In certain embodiments, the anodic metal is an alkali metal. In some embodiments, the alkali metal is sodium, lithium, or strontium. In other embodiments, the anodic metal is an alkaline earth metal. In some embodiments, the alkaline earth metal is calcium or magnesium or mixtures thereof.

In certain embodiments, the cathodic metal is independently selected from group IIIA, IVA and VA elements of the chemical periodic table. In some embodiments, the cathodic metal is tin, lead or bismuth.

In certain embodiments, the metalloid is independently selected from group IVA, VA and VIA elements of the chemical periodic table. In some embodiments, the metalloid is antimony, tellurium or selenium.

In certain embodiments, the salt of the anodic metal is selected from one or more of halide, bistriflimide, fluorosulfano-amine, perchlorate, hexaflourophosphate, tetrafluoroborate, carbonate or hydroxide. In other embodiments, the salt of the anodic metal contains a halide salt. In some embodiments, the salt of the anodic metal is a eutectic mixture of halide salts. In other embodiments, the anodic metal is lithium and the salt is a LiF—LiCl—LiI mixture. In yet other embodiments, the anodic metal is sodium and the salt is a NaCl—KCl-LiCl mixture. In certain embodiments, the salt phase further includes refractory particles distributed throughout the salt liquid phase. In other embodiments, the refractory particles may include a metal oxide.

In some embodiments, the cell electrode components may be selected from the following systems Li‖Sb-Pb, Na‖Sb-Pb, Ca-Mg‖Sb-Pb, Mg‖Sb-Pb, and Sr‖Pb-Sb. In some other embodiment, the anodic metal may be about 45% by mole of the composition of the cathode in the discharged state and the cathodic metal/metalloid mixture may be about 60/40. In another embodiment, the electrode components are Li (45 mole %), Pb (33 mole %), and Sb (22 mole %).

In certain embodiments, the components of an electrochemical cell each have a different density from the others. Accordingly, the anodic metal has a first density, the salt has a second density higher than the first density, and at least one of the cathodic metals has a third density higher than the density of the anodic metal or the salt or salt mixture of the anodic metal, or both.

In certain embodiments, the electrochemical cell is configured to exchange electrical energy with an external device. For example, the external device may be an energy source or an energy load. The electrochemical cell also may include a container holding the components, an electrical pole electrically connected to the first phase, and another electrical pole electrically connected to the third phase.

BRIEF DESCRIPTION OF THE DRAWINGS

The foregoing features of embodiments will be more readily understood by reference to the following detailed description, taken with reference to the accompanying drawings, in which.

The figures are not, in general, drawn to scale, and generally are schematic in nature.

DESCRIPTION OF ILLUSTRATIVE EMBODIMENTS

As used herein, the term "battery" may encompass individual electrochemical cells or cell units having a positive electrode, a negative electrode, and an electrolyte, as well as configurations having an array of electrochemical cells.

Embodiments of the present invention provide a method of assembling electrochemical cells that operate with molten electrodes and electrolyte by first combining an anodic metal with a cathodic metal to form a binary alloy. The purpose of pre-alloying the anodic metal with the cathodic metal to form the binary alloy is to decrease the activity of the anodic metal to an energy level closer that of the anodic metal in the cathode. The reduced activity of the anodic metal drastically reduces the rate of the reaction between the anodic metal and the metalloid in the cathode when the components first reach their molten state. The binary alloy is then placed in a cell housing with the metalloid and the electrolyte, all in the solid state. The temperature is then raised to, and maintained at, a temperature above the melting point of the highest melting component until the components assemble into horizontal layers of electrolyte above a layer of a ternary alloy formed by the combination of the binary alloy and the metalloid. A charge and discharged cycle is then run through the electrochemical cell. Details of illustrative embodiments are discussed below.

Figure 1:
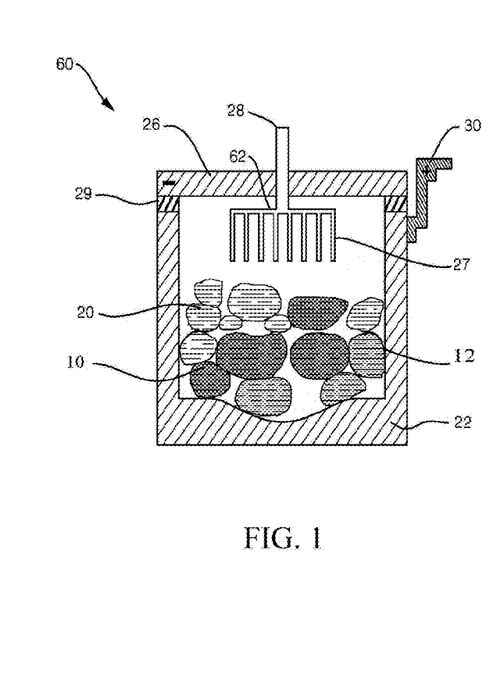
FIG. 1 is a vertical section illustrating a self-assembling metal-ion energy storage electrochemical cell with the components in the solid state prior to heating in accordance with the present invention.
Figure 2:
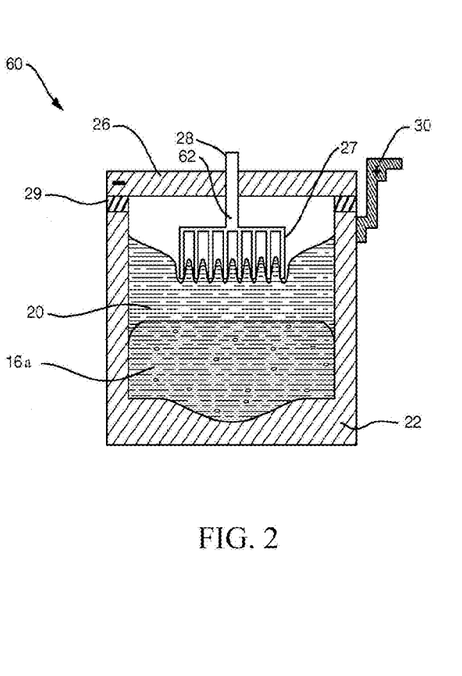
FIG. 2 is a vertical section illustrating the metal-ion energy storage electrochemical cell with the components in the liquid state after heating and the cell is discharged in accordance with the present invention.

Referring to FIG. 1, an electrochemical energy storage cell 60 configured in accordance with illustrative embodiments of the invention, may be assembled in a discharged state by following the following procedure. Electro-conductive constituents 10, 12 and 20 in their solid state, under ambient condition are placed into a housing 22. The electrochemical energy storage cell 60 is further equipped with a lid 26, which is illustratively electrically conductive. An electrically insulating seal 29 electrically isolates the lid 26 from the housing 22 to confine the constituents in solid and molten phases as well as vapors which may form at the high operating temperatures. A negative current collector 27, 62, through which electrons may pass to an external source or sink (not shown) by way of a negative terminal 28, is in contact with the lid 26 and adjusted to contact the electrolyte layer 20 (as shown in FIG. 2) during operation of the cell 60. A positive current collector 30 is electrically connected to the housing 22. The negative terminal 28 and the positive terminal 30 are oriented to facilitate arranging individual cell units in series by connecting the negative terminal 28 of one cell unit to the positive terminal 30 of another cell unit 60 to form a battery.

Three distinct initial constituents are placed within housing 22, in a solid state: an alloy 10 of the molten anodic metal (which will form the negative electrode 14 shown in FIG. 3, also referred to as anode during operation of the cell 60) and a cathodic metal, that serves as a constituent of the positive electrode 16 (shown in FIG. 2, also referred to as cathode or active metal electrode) during operation of the cell 60; a metalloid 12, that also serves as a constituent of the positive electrode 16, and the electrolyte 20 containing a salt of the anodic salt 14.

Referring to FIG. 2, the housing 22 is then sealed with the lid 26, and the cell 60 is heated to a temperature at which all the constituents 10, 12, and 20 reach their melting phase. In the liquid state, the alloy 10 combines with the metalloid 12 to form a new electrically conductive multi-elemental molten alloy 16a of the cathodic metals with the anodic metal 14. The molten alloy 16a settles at the bottom of the housing 22 and forms the positive electrode 16 (as shown as 16a, b, c in FIGS. 2, 3, 4 respectively). The electrolyte 20 containing a salt of the anodic metal having a lighter density than the alloy 16a settles as an upper layer which contacts negative current collector 27, 62.

Figure 3:
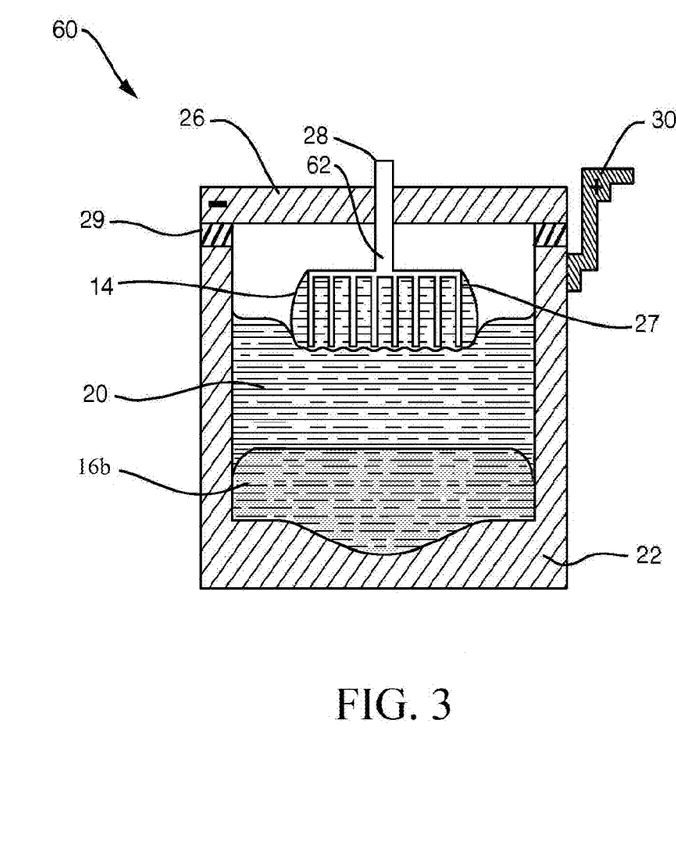
FIG. 3 is a vertical section illustrating the metal-ion energy storage cell when the cell is charged in accordance with the present invention.

Referring to FIGS. 2 and 3, a negative current collector 27, 62 is adjusted to contact the electrolyte layer 20. Negative terminal 28 and positive terminal 30 are electrically connected to an external source or sink (not shown). A current is applied to drive the anodic metal from alloy 16a to the negative current collector 27, 62 where it is accumulated in the metallic liquid phase 14, thus forming the negative electrode, until the cell is charged, that is the cathode is depleted of the anodic metal thus forming a new alloy 16b. The negative current collector 27, 62, is designed to retain the anode away from the wall of housing 22 to avoid shorting. In alternative embodiment, the interior wall of housing 22 may be coated with an insulating material.

Figure 4:
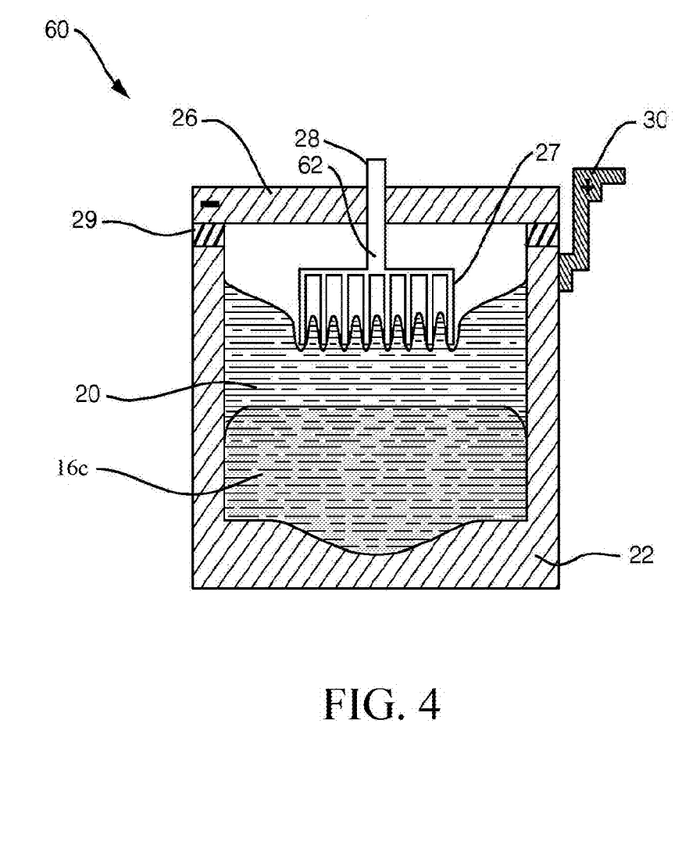
FIG. 4 is a vertical section illustrating the assembled metal-ion energy storage discharged electrochemical cell in accordance with the present invention.

Referring to FIGS. 3 and 4, the current is then reversed to discharge the cell, thus driving the anodic metal from the negative current collector 27, 62 to the cathodic alloy 18, thus forming a ternary alloy 16c of the anodic metal and the cathodic metal and metalloid. The cell is now ready to be operated for its intended purpose.

As noted, the positive electrode 16 includes at least two elements besides the anodic metal. Its composition varies continuously during the charging and discharging of the cell 60. Accordingly, the positive electrode 16 (illustrated as items 16a, 16b, and 16c in FIGS. 2-4) is multi-elemental at all times during the discharging and charging sequence described above. Elements that may be appropriate for incorporation in the positive electrode include one or more metal of Group IIIA, IVA, and VA of the periodic table of the elements, such as aluminum, gallium, indium, silicon, germanium, tin, lead, bismuth and one or more metalloid of Group IVA, VA and VIA of the periodic table of the elements, such as arsenic, antimony, tellurium and selenium. Each of the one or more additional elements may be present at a concentration of at least 5%, 10%, 25% or more in the positive electrode.

The electrolyte 20 of the cell 60 may be a liquid incorporating a salt of the anodic metal, referred to herein as the anodic cation, and one or more supporting compounds. In one embodiment, the electrolyte 20 may further incorporate one or more constituents forming a paste with the other electrolyte constituents. For example, the electrolyte 20 may include filler particles of a refractory compound, such as alumina or magnesia, held in the electrolyte by capillary forces exerted by the molten salt. The filler may act as a thickening agent, facilitating use in the cell 10 of a liquid, such as a molten salt, of high fluidity in the electrolyte 20, thus affording relatively high current densities for a given cell voltage. A paste formulation of the electrolyte 20 may also reduce solubility of the anodic metal therein, improving efficiency of the cell 60. The cell 60 may incorporate a structural member (not shown), such as mesh body, to hold the electrolyte 20 constituted as a paste in place between the electrodes.

In some embodiments, the anodic metal salt is a halide, such as a chloride, of the anodic metal. Alternatively, the salt of the anodic metal may be, for example, a non-chloride halide, bistriflimide, fluorosulfano-amine, perchlorate, hexaflourophosphate, tetrafluoroborate, carbonate or hydroxide. A supporting compound is typically added to enhance ionic conductivity, and/or to inhibit electric conductivity through the electrolyte. The supporting electrolyte may include an anion, for example, a halide, bistriflimide, fluorosulfano-amine, perchlorate, hexaflourophosphate, tetrafluoroborate, carbonate or hydroxide and cation of another metal, such as an alkali or alkaline-earth metal, or a cation from an imide, amine, ammonium, phosphonium or pyrrolidinium. Those skilled in the art should appreciate that ions in the electrolyte 20 may be in complexed states.

In one embodiment, the compositions of the electrode 14 and 16 and electrolyte 20 may be formulated so that all-liquid operation may be reached at relatively low temperatures, such as lower than about, for example, 500° C. or 400° C. Operation at relatively low temperatures may reduce the solubility of metallic anodic metal in the electrolyte 20. Difficulties such as volatilization of cell constituents, structural weakness, chemical attack of ancillary materials, and power required to maintain liquidity of the electrodes 14 and 16 and electrolyte 20 are expected to become more manageable as operating temperature decreases, reducing the cost of operating the cell 10.

The methods of the present invention are applicable to situation where the electrodes and the electrolyte 20 may be further formulated so that their densities are ordered in layers in accordance with their functions in the cell 60. Various embodiments having respective densities increasing, as shown in FIG. 3, or decreasing in the order negative electrode/electrolyte/positive electrode may spontaneously self-assemble into the illustrated vertically stacked, layered structure upon melting, providing for simpler manufacture.

FIGS. 2-3 illustrate the function of the cell 10 during charging. FIG. 2 shows the cell 60 in an uncharged or discharged state. Before charging, the positive electrode 16 contains atoms of the anodic metal. The positive electrode 16 meets the electrolyte 20 at an alloy-electrolyte interface. As shown and discussed below, this interface moves during charging and discharging, while maintaining the general volume of the electrolyte, while the volumes of the positive and negative electrodes increase or decrease at the expense of one another. In other words, the positive electrode has a volume that increases or decreases in correlation to a respective decrease or increase of the volume of the negative electrode 14 held by the negative current collector 27, 62.

FIG. 3 shows the cell 60 in its final charged state. Charging has changed the composition of at least the positive electrode 16 by loss of atoms of the active alkali metal to the positive electrode 16. In fact, in some embodiments, the positive electrode 16 may be nominally free of the anodic metal at this point in the charge-discharge cycle. The thickness of the negative electrode 14 has grown at the expense of the positive electrode 16. Since the charging process is conservative with respect to the active cations, the thickness of the electrolyte 20 is in principle unchanged.

FIGS. 3 and 4 show the discharging process. To initiate discharge, the terminals 28 and 30 are connected to an external load, which drives the anodic metal from the negative electrode 14, through the electrolyte 20 to the positive electrode 16 in which the anodic metal resides at a lower chemical potential.

FIG. 4 shows the cell 60 in its final discharged state. Discharging has changed the composition of at least the positive electrode 16 due to accretion of anodic metal atoms. The thickness of the positive electrode 16 has grown at the expense of the negative electrode 14. Since the discharging process is conservative with respect to the active alkali metal cations, ideally the thickness of the electrolyte 20 is unchanged.

The embodiments of the invention described herein play a critical role in increasing the lifetime and reliability of liquid metal battery technology. Also, these methods become increasingly useful as the size and capacity of the cells or batteries are scaled up. At higher capacities, the initial quantities of reactants in the housing are much higher and have an uncontrollable reaction, which occur in the initial stage of the cell operation and is particularly detrimental to the cell performance. In addition, controlling the reaction by decreasing the activity of lithium components enables the cathode morphology to be predictable and uniform.

There are several advantages to assembling a cell in the discharged state according the present invention. The most significant one is the ability to work with materials that are stable under ambient conditions. Thus, the embodiments of the present invention eliminate the need for specialized equipment to maintain particular environments such as glove boxes (inert atmosphere chambers) for assembling these cells. The embodiments of the present invention simplify the manufacturing lines and decrease the manufacturing costs. The previous method of cell assembly was the cause of significant unpredictability in cell performance.

Also, in the previous methods, the current collector needed to be pre-wetted with the anodic metal to improve its wicking within the interstices of the current collector, particularly when using foams. The elimination of the pre-treatment of the negative current collector, which required a high temperature in-situ treatment, further reduces costs and simplifies assembly.

The embodiments of the present invention also provide a further advantage in that the negative current collector 27, 62 may be fixed in the optimal position on the lid when the cell is initially assembled. Previously, the negative current collector 27, 62 needed to be placed at an elevated height where there was no chance of contact with the porous, high volume solids in the housing. After the initial components were melted in the housing, the negative current collector 27, 62 was then lowered until it contacted the electrolyte 20. Using the methods according to embodiments of the present invention, the volume of the positive electrode is much smaller and less variable during heating, and thus the negative current collector 27, 62 may be fixedly placed at its optimal lower position, reducing electrolyte resistance and improving efficiency.

EXAMPLES

Example 1

In the charged state of the cell, the negative electrode may be commercially pure lithium, the positive electrode initially may be a bimetallic electrode constituted entirely of antimony and lead in a 4:6 atomic ratio, and the electrolyte may be a eutectic mixture of LiCl—LiBr—LiF.

The typical discharged state assembly procedure consists of arranging the correct quantities of Li, Pb and Sb (such as 45% by mole of Li in a 40/60 mixture of Sb/Pb by mole %) at the bottom of the battery followed by the salt electrolyte. Because of the air sensitive nature of Li, this process must take place in an inert atmosphere glove box, or the capacity of the battery will be reduced as the surface of the Li metal irreversibly reacts with air and moisture. Also, as the cell is heating up to the operating temperature, an exothermic reaction takes place between the individual electrode components namely Li, Pb and Sb. The rapid uncontrolled evolution of heat during this process leads to the formation of an irregular shaped, solid, high melting temperature intermetallic composition. The overall morphology of this solid phase is difficult to control and very difficult to predict as it is the result of a violent chemical reaction involving release of large amounts of energy in a short duration of time. Internal shorting of the cell is facilitated by the formation of this voluminous solid phase, which if it is able to establish electrical contact between the two electrodes owing to its high conductivity, can cause cell failure.

Figure 5A:
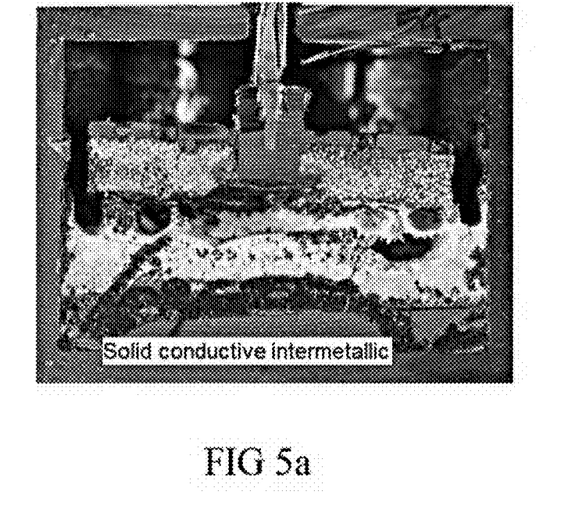
FIGS. 5a and 5b are photographs of cross sections showing two 20 Ah cells assembled in the discharged state with individual components (Pb, Li and Sb).
Figure 5B:
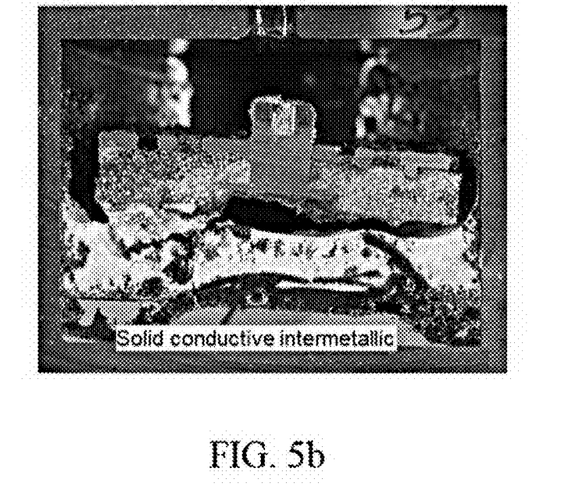

Cross sections of two 4 inch (20 Ah) cells that were assembled using this procedure are shown in FIGS. 5a and 5b. Both these cells failed to cycle after assembly. In the pictures of both cells, it can be clearly seen that the solid conductive intermetallic phase (shown in the figure) forms an irregular structure which establishes an electrical connection between the negative and positive electrodes. This connection leads to cell failure by internal shorting in the cell and prevents the cell from charging or discharging.

Example 2

Uncontrolled reaction can be avoided by adopting a novel assembly procedure. The key step is the pre-alloying of lithium with the cathodic metal instead of using the pure lithium in assembling the components with the metalloid. The purpose of pre-alloying is to decrease the activity of lithium to an energy level closer to that of lithium in the cathodic alloy. This reduced activity of lithium drastically reduces the rate of the reaction between the lithium and antimony in the cathode when the cell is heated up to the melting point of the metalloid and the components reach their molten state. In addition, the lithium cathodic metal alloy is much safer to handle in air than pure lithium, and will not react with air and moisture. This retains the capacity of the battery, as well as allows assembly in open ambient air.

Figure 6:
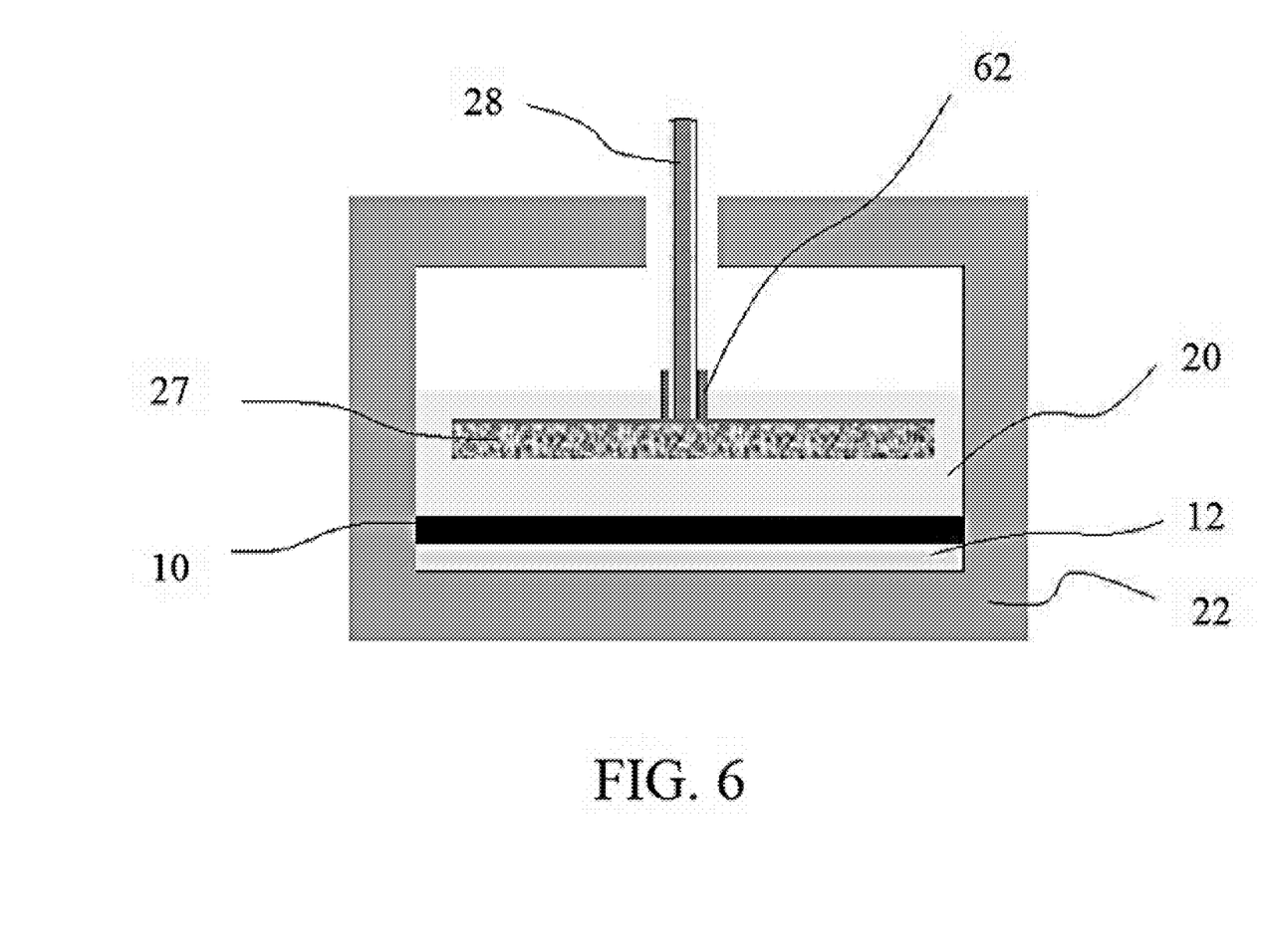
FIG. 6 is a vertical section illustrating the cathode composition of a cell assembly prior to heating showing antimony and lead-lithium alloy poured as separate layers.
Figure 7A:
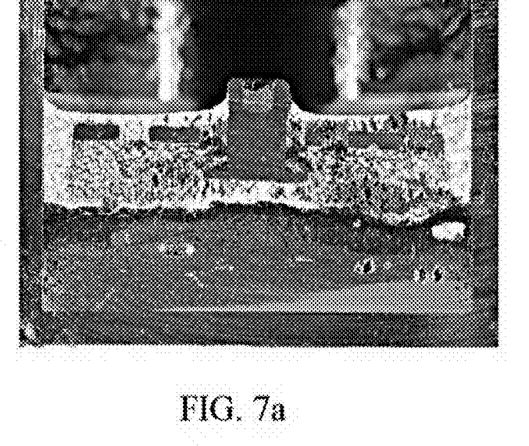
FIGS. 7a and 7b are photographs of a cross section showing two 20 Ah cells assembled in the discharged state with the layered antimony and lead-lithium alloy.
Figure 7B:
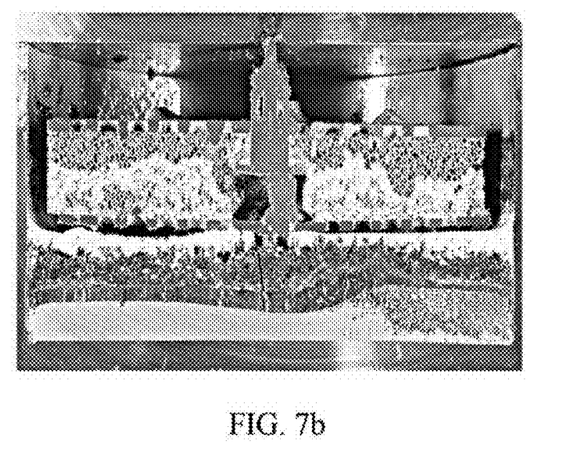

Following a procedure in accordance with an embodiment of the invention, lithium is first alloyed with lead in the molten state which is characteristically a mildly exothermic reaction. Antimony and the lead-lithium alloy are then poured successively into the cell housing to form two distinct layers. Sufficient time is to be provided after pouring the first liquid layer to allow it to solidify before pouring the next liquid layer (such as shown in FIG. 6. The metals may also be cast into 'pucks' of the appropriate size to be assembled together at a later time (such as shown in item 10 of FIG. 1. Due to the pre-alloying of lithium, the reaction between lithium (in the lead-lithium alloy) and antimony is much milder and results in a uniform morphology of the resulting high-melting temperature intermetallic solid. This obviates the risk of premature cell failure through internal shorting. A schematic of the initial state of a cell assembled using this type of procedure is shown in FIG. 6. A cross section of a cell assembled using embodiments of the present invention is shown in FIGS. 7a and 7b. In comparison to FIGS. 5a and 5b, it can be clearly seen that the solid intermetallic forms a uniform and flat layer between the positive electrode and the salt layer. Formation of a uniform layer of the solid phase drastically reduces the risk of initial shorting of the cell and efficiently tackles one of the major failure mechanisms during discharged state assembly.

Also, wetting of Li in the negative current collector (e.g., foam) is critical to operating the cell without an insulating sheath along the sidewall of the cell, as it prevents the Li negative electrode from contacting the cell wall (positive current collector). Another advantage in following the present procedure for assembling the cell is that there is no need to pre-treat the metal negative current collector, e.g., by pre-soaking foam in liquid Li. It was found that by maintaining a temperature above 500° C. during the first charge, the current collector will fully wet with Li in-situ. A higher temperature (~650° C.) is preferred to insure good wetting, but must only be maintained during the first charge. Subsequent cycling can take place at normal operating temperature.

Figure 8:
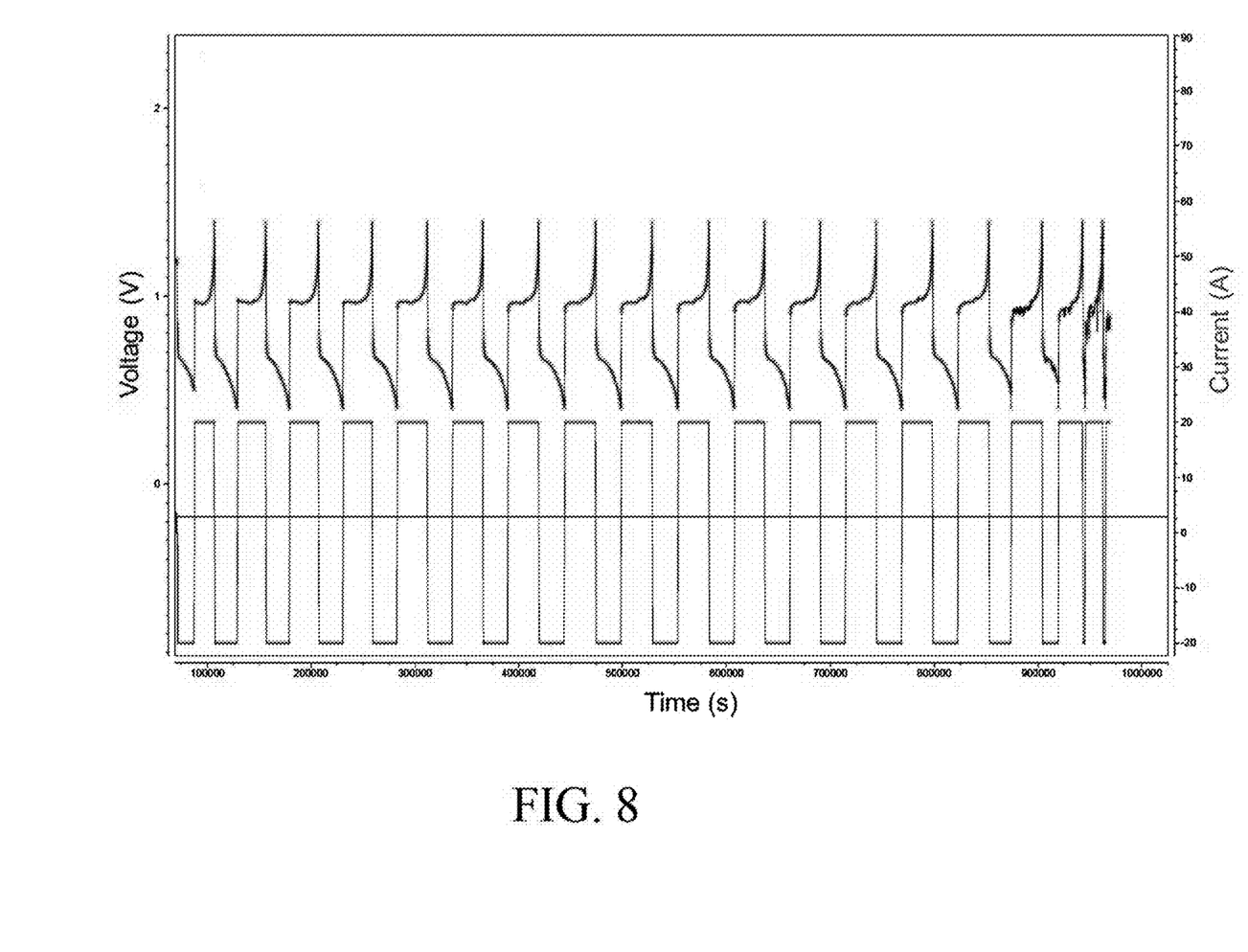
FIG. 8 is a diagram of the cycling data (voltage vs. time and current vs. time) for a cell assembled in the discharged state in accordance with an embodiment of the invention with the layers of antimony and lead-lithium alloy.

The cycling data (voltage vs. time and current vs. time) of the cell assembled as described in this example are shown in FIG. 8. The cell was able to achieve good and reliable performance and did not show any indications of premature shorting as was commonly observed in the previous cells. The general performance data averaged over the first 14 cycles is summarized below. The nominal discharge voltage was 0.61 V while the coulombic efficiency was 84% and the energy efficiency was 50%. The lithium utilization was 66.6%. There is definitely some scope for further improving the performance by optimization of the electrolyte layer which will allow an increase in the energy efficiency and nominal voltage. However, elimination of one of the principle failure mechanisms is a necessary precursor to the optimization and finer tweaking of other parameters to achieve further performance improvement.

Although specific embodiments of the present invention have been exemplified with lithium based cells, there are numerous other suitable cells with other chemistries that may benefit from the embodiments of the present invention, such as Na||Sb-Pb, Ca-Mg||Sb-Pb, Mg||Sb-Pb, and Sr||Pb-Sb, etc. Although specific features of the invention are included in some embodiments and drawings and not in others, it should be noted that each feature may be combined with any or all of the other features in accordance with the invention. It will therefore be seen that the foregoing represents a highly advantageous approach to storage for small-scale, medium-scale, and large-scale systems, as well as enhancing commercial energy management. The terms and expressions employed herein are used as terms of description and not of limitation, and there is no intention, in the use of such terms and expressions, of excluding any equivalents of the features shown and described or portions thereof.

The embodiments of the invention described above and illustrated in the drawings are intended to be merely exemplary; numerous variations and modifications will be apparent to those skilled in the art. All such variations and modifications are intended to be within the scope of the present invention as defined in any of the appended claims.

What is claimed is:

1. A method of assembling an electrochemical cell having a housing and positive and negative current collectors, the method comprising:
providing a binary alloy formed from an anodic metal of group IA or IIA of the periodic table of the elements and a cathodic metal other than the anodic metal;
placing the binary alloy in a solid phase in the housing with a metalloid in a solid phase and an electrolyte in a solid phase, the electrolyte comprising a salt of the anodic metal;
heating the binary alloy, the metalloid and the electrolyte to form two liquid layers, wherein a first layer comprises the electrolyte, and a second layer comprises an alloy of the anodic metal, the cathodic metal and the metalloid;
contacting the negative current collector with the electrolyte and the positive current collector with the alloy; and
charging the electrochemical cell to drive the anodic metal in the alloy to the negative current collector.

2. The method of claim 1, wherein the anodic metal is an alkali metal.

3. The method of claim 2, wherein the alkali metal is sodium or lithium.

4. The method of claim 1, wherein the anodic metal is an alkaline earth metal.

5. The method of claim 4, wherein the alkaline earth metal is calcium or magnesium.

6. The method of claim 1, wherein the cathodic metal is selected from group IIIA, IVA or VA elements of the chemical periodic table.

7. The method of claim 6, wherein the cathodic metal is tin, lead or bismuth.

8. The method of claim 1, wherein the metalloid is selected from group IVA, VA or VIA elements of the chemical periodic table.

9. The method of claim 8, wherein the metalloid is antimony.

10. The method of claim 1, wherein the salt is a eutectic mixture of halide salts.

11. An electrochemical cell comprising:
a positive current collector and a negative current collector electronically insulated from one another;
a binary alloy in a solid phase, the binary alloy comprising an anodic metal of group IA or IIA of the periodic table of the elements and a cathodic metal other than the anodic metal;
a metalloid in a solid phase;
an electrolyte in a solid phase, the electrolyte comprising a salt of the anodic metal; and
a housing, the housing containing the binary alloy, the metalloid, and the electrolyte, wherein the binary alloy, the metalloid and the electrolyte are configured such that when the electrochemical cell is heated to an operating temperature the anodic metal in a liquid phase has a density lighter than a density of the electrolyte in a liquid phase, and the electrolyte has a density lighter than a density of either of the cathodic metal and the metalloid in a liquid phase, and configured such that when the electrochemical cell is heated to an operating temperature the negative current collector contacts the anodic metal.

12. The electrochemical cell of claim 11, wherein the anodic metal is an alkali metal.

13. The electrochemical cell of claim 12, wherein the alkali metal is sodium or lithium.

14. The electrochemical cell of claim 11, wherein the anodic metal is an alkaline earth metal.

15. The electrochemical cell of claim 14, wherein the alkaline earth metal is calcium or magnesium.

16. The electrochemical cell of claim 11, wherein the cathodic metal is tin, lead or bismuth.

17. The electrochemical cell of claim 11, wherein the metalloid is antimony.

18. The electrochemical cell of claim 11, wherein the salt is a eutectic mixture of halide salts of the anodic salt.

19. The method of claim 1, wherein the cathodic metal and the metalloid are selected from group VA elements of the chemical periodic table.

20. The electrochemical cell of claim 11, wherein the cathodic metal and the metalloid are selected from group VA elements of the chemical periodic table.

* * * * *